United States Patent

[11] 3,567,851

[72] Inventor Aurelio Beltrami
Via Circo 4, Milan, Italy

[21] Appl. No. 633,190
[22] Filed Apr. 24, 1967
[45] Patented Mar. 2, 1971
[32] Priority Aug. 6, 1966
[33] Italy
[31] 21,177

[54] ELECTRONIC SYSTEM FOR FAST TRANSMISSION OF TWO TONALITIES FIXED IMAGES
5 Claims, 32 Drawing Figs.

[52] U.S. Cl. .......................................................... 178/6.8, 178/7.1, 178/68
[51] Int. Cl. .......................................................... H04n 7/12
[50] Field of Search ............................................ 178/6 (UM), 6 (BWR), 6.8, 7.1, 68 (Inquired)

[56] References Cited

UNITED STATES PATENTS

| | | | |
|---|---|---|---|
| 2,752,421 | 6/1956 | Ross | 178/6BWR |
| 3,229,033 | 1/1966 | Artzt | 178/6VM |
| 3,275,746 | 9/1966 | Beltrami | 178/6.8 |
| 3,402,258 | 9/1968 | Lerner | 178/6BMR |
| 1,936,947 | 11/1933 | Morgenstern | 178/68 |
| 2,138,577 | 11/1938 | Gray | 178/6BW |
| 3,032,745 | 5/1962 | Hamer | 178/68 |
| 3,410,953 | 11/1968 | Quinlan | 178/6BW |
| 3,465,101 | 9/1969 | Christian | 178/68 |

*Primary Examiner*—Robert L. Griffin
*Assistant Examiner*—Joseph A. Orsino, Jr.
*Attorney*—Young and Thompson

ABSTRACT: An electronic system for fast transmission of two tonalities fixed images, through telephone plants wherein there is transmitted only a pulse corresponding to the points where there is a variation of tonality and to the points corresponding to the starting of the end line pulses. At the reception end, the image is reconstructed on a picture tube, by means of a raster having a two speed line axis and a staircase frame axis.

INVENTOR
AURELIO BELTRAMI
BY Young & Thompson
ATTYS.

INVENTOR
AURELIO BELTRAMI
BY
Young & Thompson
ATTYS.

INVENTOR
AURELIO BELTRAMI
BY
Young + Thompson
ATTYS.

INVENTOR
AURELIO BELTRAMI
BY
Young + Thompson
ATTYS.

INVENTOR
AURELIO BELTRAMI
BY
Young + Thompson
ATTYS.

INVENTOR
AURELIO BELTRAMI
BY
Young & Thompson
ATTYS.

INVENTOR
AURELIO BELTRAMI
BY
Young & Thompson
ATTYS.

INVENTOR
AURELIO BELTRAMI
BY
Young + Thompson
ATTYS.

INVENTOR.
AURELIO BELTRAMI

BY

Young & Thompson
ATTYS.

INVENTOR
AURELIO BELTRAMI
BY
Young & Thompson
ATTYS.

ELECTRONIC SYSTEM FOR FAST TRANSMISSION OF TWO TONALITIES FIXED IMAGES

The invention relates to an electronic system and its relevant apparatus for fast transmission of two tonalities fixed images, and more particularly it relates a system of the above said type, where the transmission is obtained through telephone exchanges and telephone connections.

It is known that the transmission time of any image, including two tonalities, increases when the frequency band admitted by the connection line between the transmitter post and the receiver one decreases. The connection line may be the usual telephone double-wire, the coaxial, hertzian or coherent light radiation, or the like. For example, a handwritten or typewritten page containing 300 words, or a drawing on a page having the same dimensions, require a time of about 200 seconds to be transmitted, along the usual telephone line, on a carrier frequency of 3,000 Hz.

The basic principle of the system object of the invention, is to transmit only the points necessary to the reconstruction, at the receiver, of the two tonalities fixed image, and to reduce the whole transmission time of the whole image to a little more than the time required for the transmission of such necessary points. The remaining points of the image, are not transmitted but, owing to a particular proceeding, all the points of the image regain their right position at reception.

This proceeding consists in the use of a new type of cathode-ray tube raster having a two-speed scanning line axis and staircase frame axis. The time of a line is different from the times of the other lines. The time of a frame is different from the time of the other frames. The frame axis is obtained by the integration of the line pulses. One speed of the scanning line, the low one, is used to transmit, by means of single, detached sinusoidal oscillations, the tonality change points, or transition points, (for instance passage from white to black or vice versa), and the beginnings of the line pulses. The other speed, the high one, is used for successive points of constant tonality. These points are not transmitted. The high speed may be several tens of times higher than the low one. The number of all points of a printed page, handwritten or typewritten is generally from 15 to 25 times higher than the tonality transition points. For a two tonality drawing, this ratio may be much higher (for instance from 50 to 100 times). Therefore, the transmission time is practically reduced to a little more than the transmission time of the tonality change points and of the points corresponding to the beginnings of the line pulses. This time is equal to about one-twentieth per handwritten or printed page, that is to about 10 seconds and to one-fortieth or less for a normal two tonality drawing, generally equal to about 4 seconds. It is also possible to ascribe high speed to the tonality having the greatest surface and low speed to the one having the smallest surface, the time required for transmission being, however, remarkably higher.

The transmission time nearly equals the time necessary for the transmission of the tonality change points and for the points corresponding to the beginnings of the line pulses. As the transmission time of each tonality change point and of the points corresponding to the beginning of line pulses cannot be less than the time required for a single oscillation of the greatest frequency transmissible along the line, if the time of such single wave is reduced, the transmission time of the whole mentioned video image is reduced, too. If we pass, for instance, from frequency 3,000 to 30,000, provided such frequency is acceptable both by the telephone exchange and the connection lines, the transmission time of the above-mentioned page will be of about 1 second. For short distances between the subscribers that may come into communication with each other, as for instance the case of private telephone exchanges, the carrier frequency of the tonality change pulses and of the starting points of line pulses can be further increased. Therefore the transmission time of the whole image is further diminished.

Should the lines and the telephone exchange admit high frequencies, such as several hundreds of kHz. instead of one second the transmission time of only one picture of the image will be reduced from one second to a little split second. Thus, the two subscribers will not be disturbed, during conversation, by the transmission of only one picture or even of repeated pictures.

Televideophonic transmission with practically contemporary bilaterality, will also be possible, as the single pictures of two tonality images are transmitted in the contrary direction in noncoincident split seconds. If, for instance, the frequency of the single wave is of 600 kHz., one-twentieth of a second will be needed to transmit a picture of the page according to the present proceeding and one second instead will be needed to transmit according to the ordinary proceeding, always on 600 kHz. Should we transmit the same page in one-twentieth of a second according to the ordinary proceeding, the carrier frequency should be of 20 times 600 kHz., that is 12 MHz.

With a kinescope having a very persistent screen, in a room with a fade lighting, videoreception, even of only one picture, allows the reading of the transmitted page even for some minutes. Should the subscriber require it, he may get a duplicate of the picture in a few seconds, by using a suitable paper or film. The use, at reception, of a storage kinescope is possible, as well as the use, at transmission, of a vidicon with electromagnetic or electrostatic deflections, but its cost is remarkable. Therefore, it has been thought useful to develop an apparatus for the transmission of the whole image by small p0rtions in subsequent times. This solution allows video reception in full light, with no flicker and for the whole required time, without a storage tube.

The short transmission time of a single frame results in long distance communications, in a remarkable diminution of operating cost, because the line is engaged for a much shorter time than is required with present techniques.

The short transmission time is very important for communications (private, urban and interurban) with microfilm archives. In fact the Microfilm-Archives, being engaged for a very short time with each call, that is the formation time of only one frame on the receiver kinescope, may automatically become available for a subsequent call.

The mentioned electronic proceeding for the transmission of the whole image may be either of the unilateral or of the bilateral type.

For the unilateral type, the subscriber, who is transmitting, scans by means of a low persistence cathode-ray tube, while the subscriber, who is receiving, uses a high persistence cathode-ray tube, allowing, if necessary, immediate duplication.

For the bilateral type, each subscriber owns a video transmitting-receiving apparatus, equipped with one low and one high persistence tube.

When the subscriber is transmitting, he scans the image with the low persistence tube and controls his video transmission with the high persistence tube, acting as monitor. When he receives, the high persistence tube acts as kinescope, while the low persistence one will be used for nearly immediate duplication, should it be required.

The main characteristics of the above-mentioned electronic process may be summarized as follows:

1. Image scanning and image reproduction are realized by means of a cathode-ray raster of a new type, with two-speed scanning line axis and with a staircase frame axis obtained by integration of line pulses, both on transmission and on reception.

2. The connection line between the subscribers carries only detached pulses, each of them consisting of a single sinusoidal oscillation, which enters the line without harmonics and transitory phenomena. The frequency of such oscillation corresponds to the greatest one acceptable by the line and by the telephone exchange and must not interfere with adjacent lines carrying analogous single wave signals.

3. The single detached sinusoidal oscillations correspond to the tonality transition points as well as to the beginnings of end line pulses, which are transmitted as single detached sinusoidal oscillations, but with discrimination possibility as regards those corresponding to the tonality transition points.

4. The transmission time of the image is short or very short. Therefore, it does not prevent practically contemporary telephone transmission.

5. No modifications are needed for the telephone exchange and for the connection lines. It is only necessary to equip the ordinary telephone apparatus with a special video apparatus, having small dimensions and a low cost.

6. Possibilities of economic immediate duplication of the image.

7. Low installation cost as regards the ones used at present; the installation cost corresponds only to the cost of the video transmitting-receiving device to be installed by the ordinary telephone apparatus.

8. Low operating cost, as regards the other systems used at present, owing to the short transmission time which is very important, especially for long distance communications.

The electronic apparatus, to be installed by the ordinary telephone apparatus to actuate this new system, may be realized, both from the circuit point of view and from the constructive point of view, in many different ways, which are all included in the scope of the present invention.

In order to reduce its cost and dimensions as much as possible, it will be necessary to construct the video transmitting apparatus by microminiaturization. Here are described in detail three examples of apparatus formed by means of printed circuits. The first example concerns unilateral transmission with kinescope or storage tube, while the second one concerns bilateral transmission, again with kinescope or storage tube. The third example is relevant to the transmission of the whole image by small subsequent portions.

The frequency of the above-mentioned single detached sinusoidal oscillations has been chosen to be 3 kHz. for experiments concerning urban communications; for long distance communications the frequency must be lowered, while for private telephone exchanges it may be raised.

FIG. 1 represents the conversion of the signal to be transmitted, consisting of only one segment, into rectangular tonality transition pulses.

FIG. 2 represents the subsequent conversions until single detached sinusoidal oscillations are obtained, relevant to the scanning of only one line of signal AV!

FIG. 3 represents the subsequent conversions at reception of the signal shown in FIG. 2, relevant to the scanning of only one line, starting from the single detached sinusoidal oscillations received, until the reproduction on the kinescope of the line scanned at transmission.

FIG. 4 represents the two apparatus, respectively at the transmission, and at the reception, for video unilateral transmission.

FIG. 5 represents the apparatus for video unilateral transmission.

FIG. 6 represents the apparatus for video unilateral reception.

FIG. 7 shows the apparatus of the two subscribers for video bilateral transmission.

FIG. 8 shows the block diagram of the apparatus at one of the two subscribers for video bilateral transmission.

FIG. 9 shows the apparatus of the two subscribers for bilateral transmission, by small portions of the image in subsequent times, with automatic video-phone commutation and vice versa.

FIG. 10 shows the block diagram of the apparatus at one of the two subscribers for the transmission by small portions of the image in subsequent times with automatic video-phone commutation and vice versa.

UNILATERAL TRANSMISSION

First Example

Figure 4:
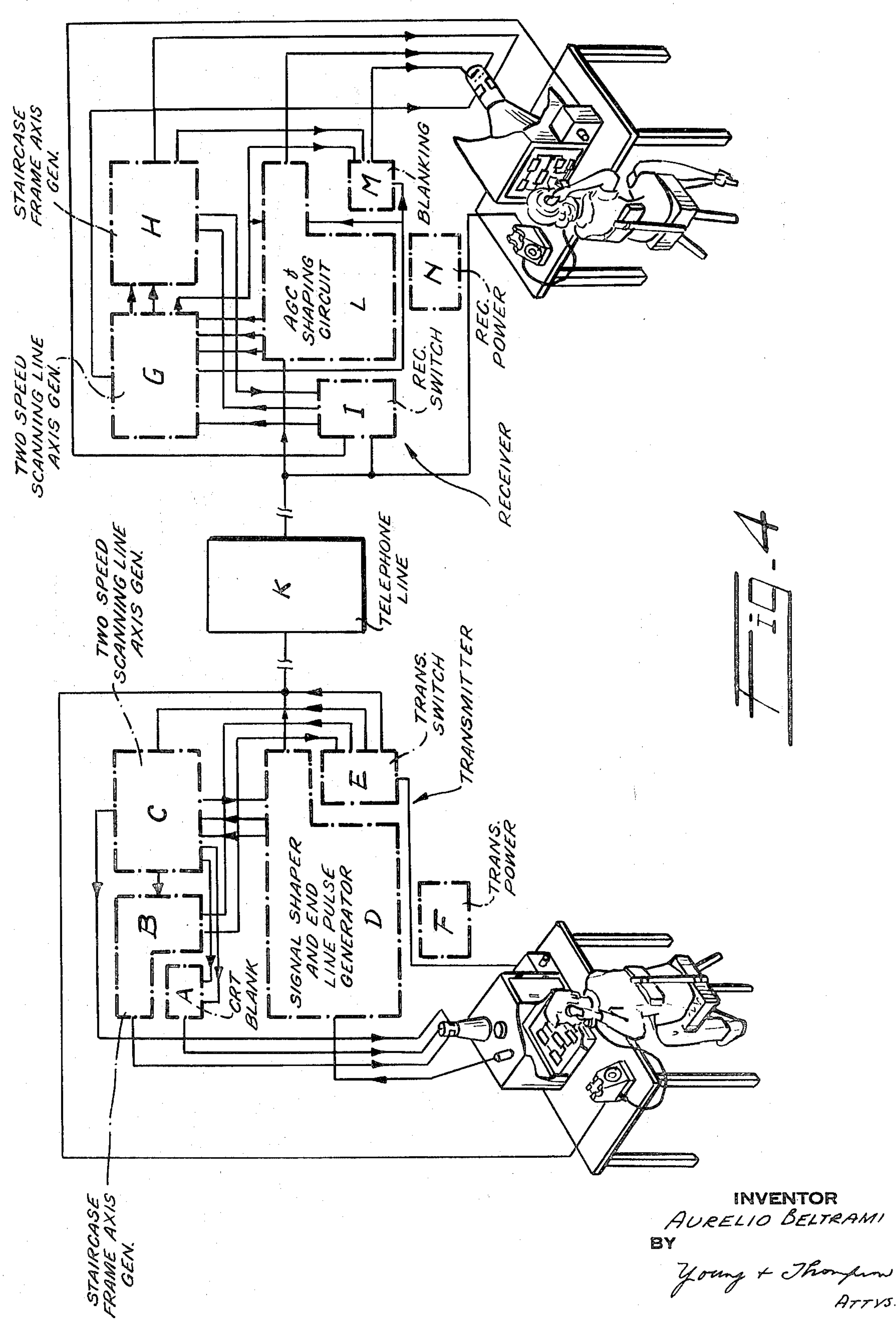

Blocks A, B, C, D, E, F of FIG. 4 are the elements of the electronic circuit added to the ordinary telephone apparatus of the transmitting subscriber. Blocks H, I, L, M, N of FIG. 4 are the elements added to the ordinary telephone apparatus of the receiving subscriber.

For a better comprehension, the proceeding has been divided according to its various stages, that is:

Transmission

1. Shaping of the video signal in order to make it suitable to control the two-speed scanning line and to make it suitable to transmit, along the line, under the form of single detached sinusoidal oscillations, the tonality transition pulses.

2. End line pulses and their conversion into single detached sinusoidal oscillations to be transmitted along the line.

3. Scanning raster with two-speed scanning line axis and a staircase frame axis.

4. Switching from phone to video and vice versa, at transmission.

Reception

5. Switching from phone to video and vice versa at reception.

6. Automatic gain control.

7. Shaping of the received single detached sinusoidal oscillations, to make them suitable to control the two-speed scanning line axis, as well as the intensity of the electron beam.

8. Receiver raster with two-speed scanning line axis and a staircase frame axis.

The single operations in a more particular way are now described as follows:

1. Shaping of video signal to make it suitable to control the two-speed scanning line axis and to make it suitable to transmit along the line, under the form of single detached sinusoidal oscillations, the transition points. The video signal obtained by the circuit of the phototransducer, as regards the two-speed scanning, before being sent to control the two-speed scanning line axis, must be shaped so that only two clear levels appear, corresponding to the two tonalities of the image. Moreover, the tonality transition pulses must be represented by rectangular pulses, having a time equal to the one of a complete single sinusoidal oscillation, of the greatest frequency admissible by the telephone exchange as well as by the relative connection line. This time will be called "unitarian."

The length of the scanned segment may be superior, equal or inferior to the one of the "unitarian" segment. This segment corresponds to the segment scanned at low speed in the time needed for the formation of one of the above mentioned single oscillations. If the length of the scanned segment is superior to the "unitarian" one, as in FIG. 1*a*, the transition rectangular pulses, of an equal width, but opposite in sign and with "unitarian" time, will appear detached from one another. Therefore, an intermediate area will exist among them, which will be scanned at high speed.

If the length of the scanned segment is equal to the "unitarian" one, the intermediate area will not exist. (FIG. 1*b*).

Figure 1A:
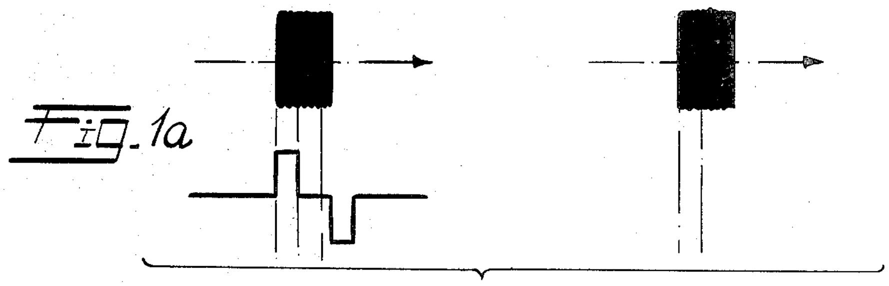
FIGS. 1 to 8 are relevant to the first two examples.
Figure 1B:
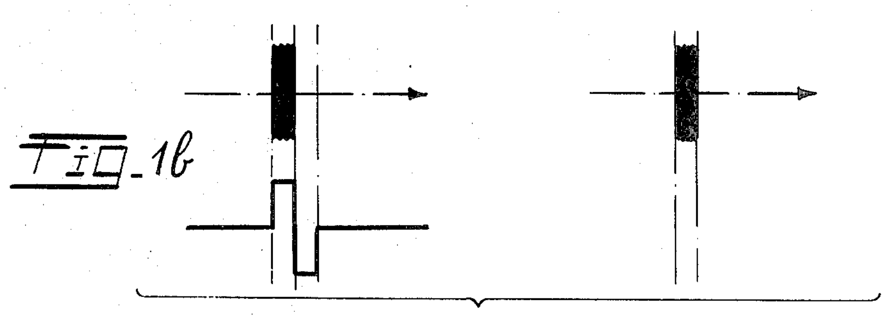
Figure 1C:
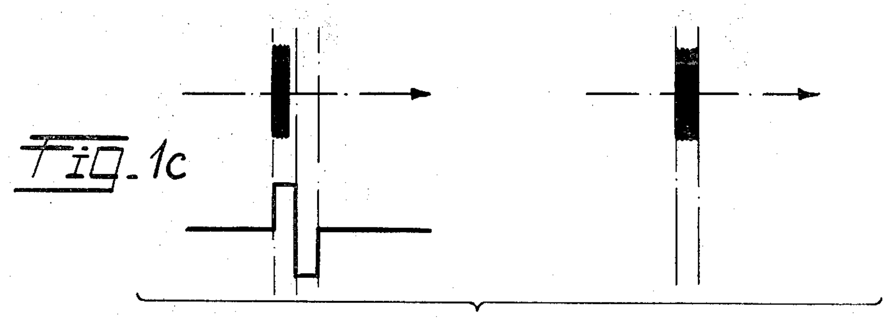

If the length of the scanned segment is slightly inferior to the "unitarian" one (FIG. 1*c*) the two transition pulses will constitute two zones of contrary sign, which are in contact, as in the case of FIG. 1*b*. They will cause reception of a segment having a "unitarian" length.

Figure 1D:
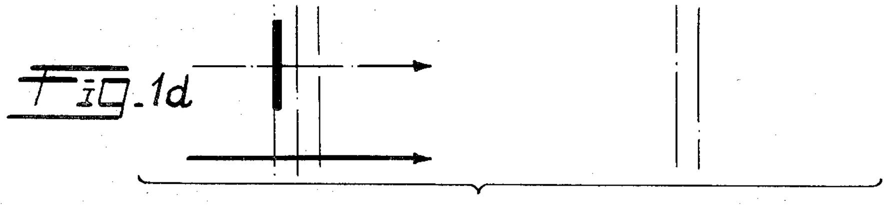
Figure 1E:
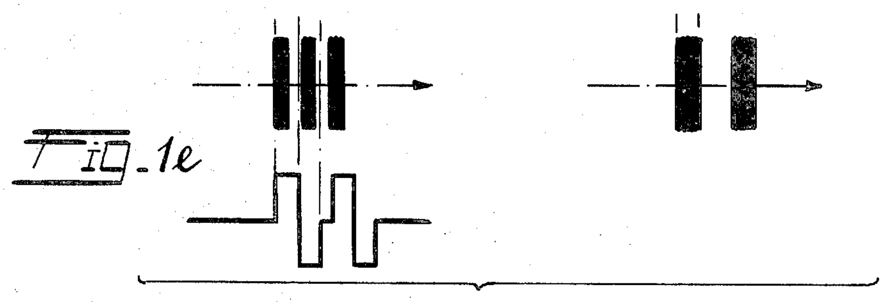

When the length of the segment is inferior, (FIG. 1*d*), the power of the video signal corresponding to the transition points will not be sufficient for its detection; therefore this segment will not be reproduced. In case there was (FIG. 1*e*) a series of segments of a length slightly inferior to the "unitarian" one, some segments will not be reproduced.

It must be kept in mind that this process allows the reproduction at reception of a greater resolution than the one admitted by the adopted raster, that is the reproduction of segments having a length not much inferior to the "unitarian" one, appear to be a "unitarian" length at reception.

This facility does not exist by using traditional methods.

Figures 2A, 2B, 2C, 2D, 2E, 2F, 2G, 2H, 2I, 2L, 2M:
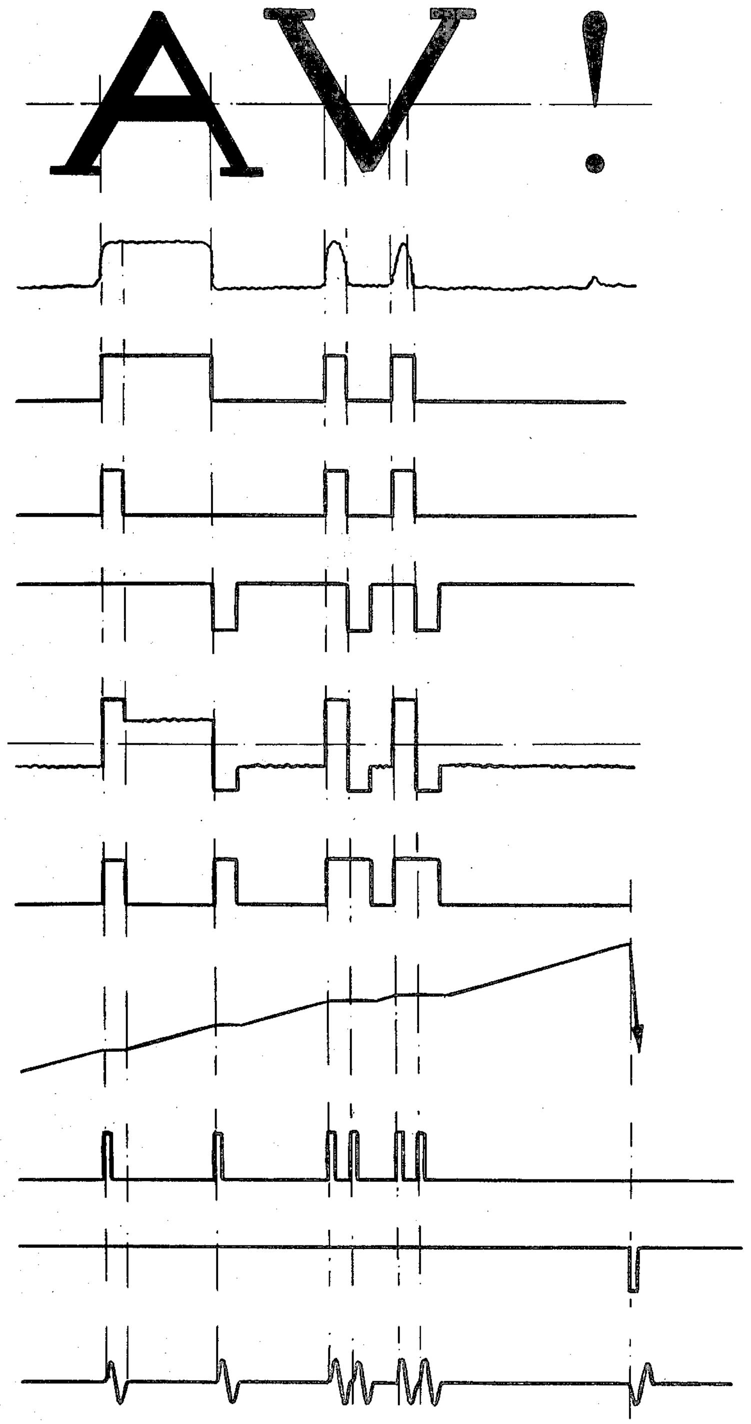

In FIG. 2 are represented the subsequent stages through which the video signal passes during the partial scanning of letters AV!, 16 times enlarged (FIG. 2*a*), from the output from the video amplifier to the input to the connection line between the two subscribers, and also the two-speed scanning line relevant to the transmitting raster (FIG. 2*h*).

In FIG. 3 are represented the subsequent stages through which the received signal passes before reaching the control grid of the receiving kinescope. In FIG. 3 there is also represented the two-speed line axis, relevant to the receiving raster.

Figures 3A, 3B, 3C, 3D, 3E, 3F, 3G, 3H, 3I:
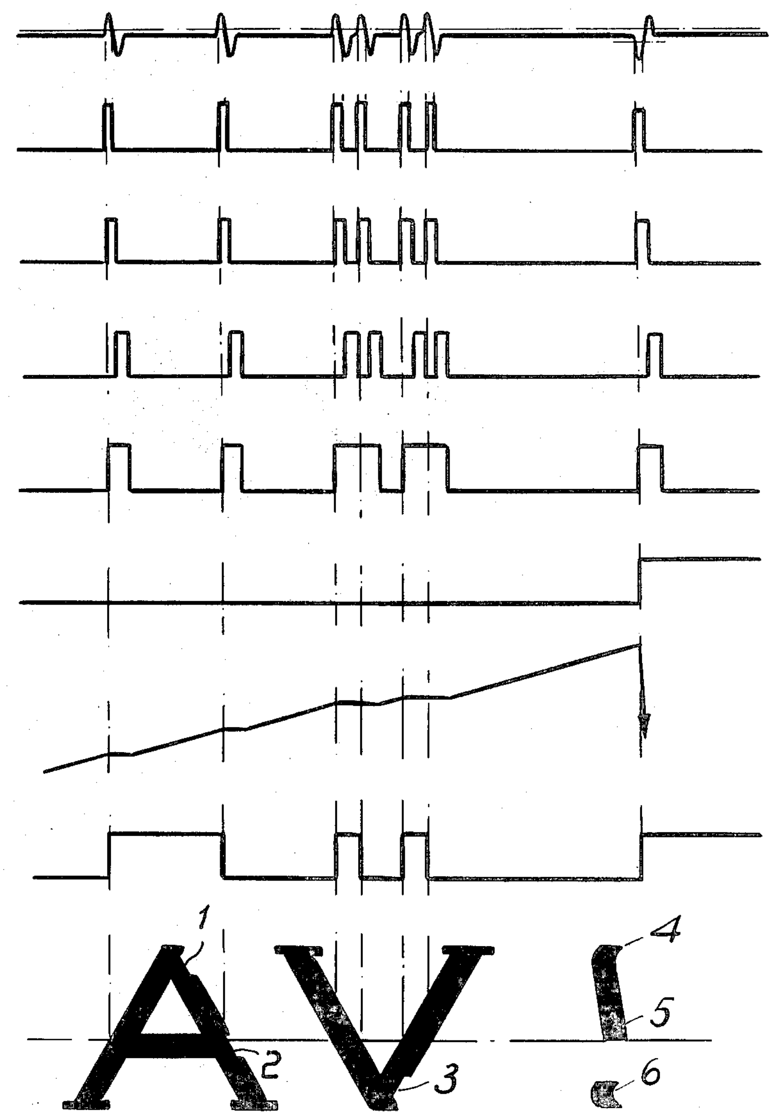

In FIG. 3*i* there is represented the reproductions at the receiver of letters AV!. The defects in reproduction, indicated by 1–2–3–4–5–6, when reduced to real dimensions, (16 times smaller) are invisible to visual acuity.

Figure 5:
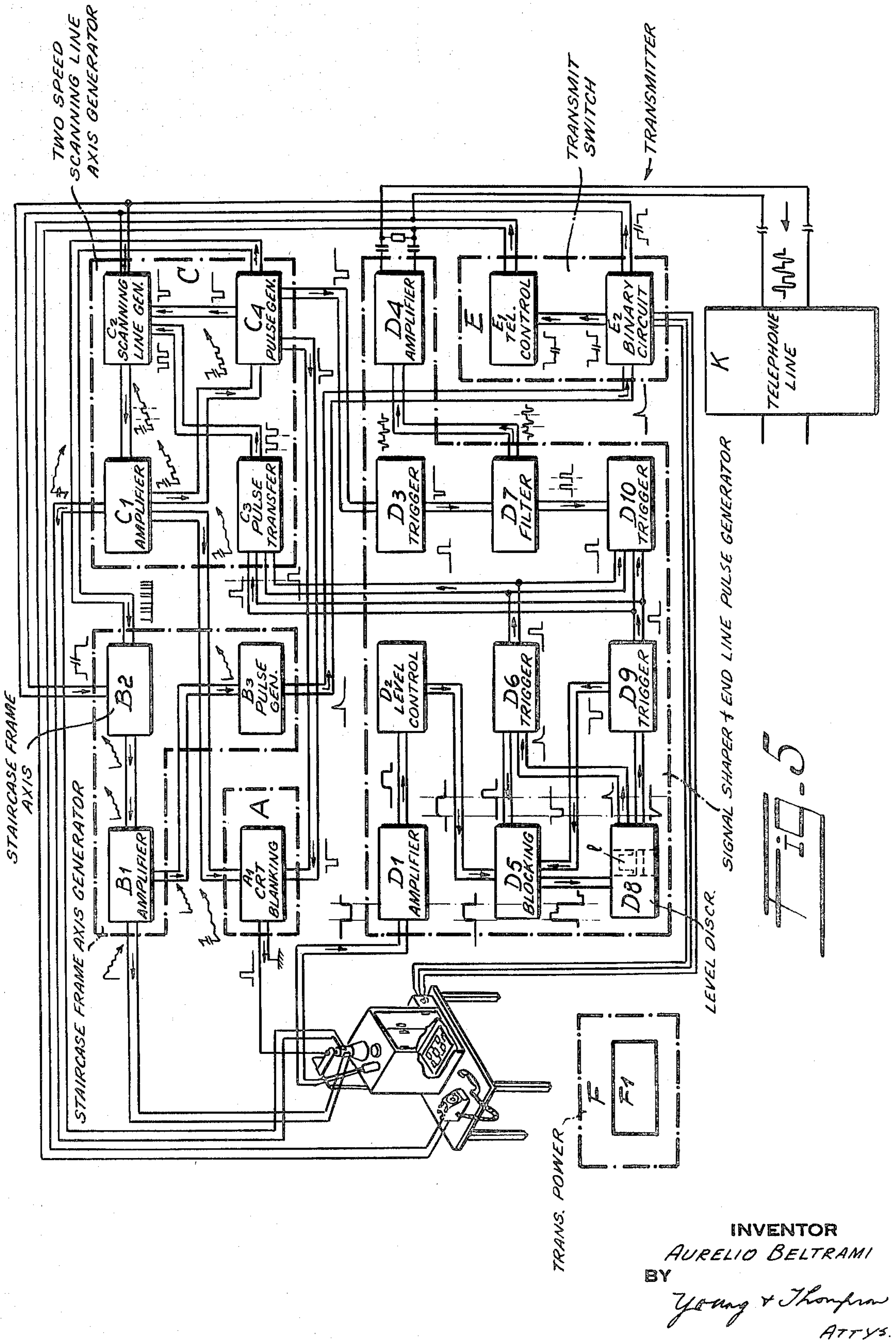

The above-mentioned shaping is realized in this case through the circuits corresponding to block D of FIG. 4 which includes blocks D1, D2, D5, D6, D8, D9 of FIG. 5. Block D1 represents the amplifier circuit for video voltage, resulting at the extremes of external resistance of the phototransducer circuit. The output of D1 corresponds to the signal of FIG. 2*b*.

Block D2 is used to attenuate the differences in intensity of signals corresponding to the tone which shows the greatest reflection coefficient. This is necessary for the subsequent conversion of signals into two levels by means of D8 circuit, which, in case the signal had not undergone such attenuation through D2, could not receive the signals of some zones of the documents to be transmitted. The video signal coming out from level control circuit D2 circuit is irregular owing to reflection variable from point to point, both of a tone and of the other. This signal involves the inevitable internal and external noises. Therefore, the signal must become a signal having two well defined constant levels, which is obtained through the level discriminator contained in circuit D8.

Circuit D8 consists of a bistable trigger circuit with two stable positions, followed by a circuit to obtain two differentiated pulses.

Circuit D8 requires a blocking device (D5) to solve the problem occurring when a segment, having a length inferior to the "unitarian" one, must be scanned. Should the necessity of solving such problem not exist, the blocking device would not be required.

Through D5 the video signal from D2 reaches circuit D8 and from circuit D8 two differentiated pulses, on two separated double-wire lines come out, the former being positive, the latter being negative, corresponding to the two tonality transition points. By means of the two lines the above-mentioned pulses reach respectively the two monostable trigger circuits D6 and D9, from which come out respectively rectangular pulses with a "unitarian" time, the former being positive (FIG. 2*d*), the latter being negative (FIG. 2*e*).

The monostable trigger circuit D6 transmits the positive "unitarian" pulse to the blocking circuit D5, while the monostable trigger circuit D9 acts in the same way as regards the negative "unitarian" pulse. The transmission of such pulses to the blocking circuit is carried out to delay the level commutation to a time before the "unitarian" time is expired.

FIG. 2*f* gives the video signal, modified by such pulses, as it comes out from the blocking circuit D5 and as it goes to control the bistable trigger circuit with two stable positions contained in D8.

FIG. 2*c* gives the signal at the output from the level discriminator contained in D8. Such signal is indicated with 1 in D8 of FIG. 5.

The endline pulses will be sent on the line besides the transition pulses. All the above-mentioned pulses are rectangular and therefore their contents in harmonics are not acceptable by the line (because of crosstalk and of the different attenuation of the harmonics according to the distance between the subscribers).

Therefore, such rectangular pulses must be converted into single detached sinusoidal oscillations (or nearly sinusoidal). Such conversion has been obtained in this case by sending the pulses coming from D6 and D9, the latter one made positive for this purpose, to excite the monostable trigger circuit D10, which provides rectangular pulses having a time equal to about one-third of the "unitarian" time. Such pulses starting at the beginning of the risetime of the rectangular pulses exciting them (FIG. 2*i*).

Such pulses are sent to circuit D7 which consists of a differentiator followed by an oscillatory circuit or by more series connected oscillatory circuits, with resonance frequency corresponding to the frequency of the single sinusoidal oscillation of "unitariatn" time and prefixed damping.

Circuit D4 amplifies such sinusoidal signals which are then put in the ordinary telephone line K.

2. Endline pulses. Circuit D3 consists of a monostable trigger circuit analogous to D10, its function being to generate pulses whose polarity is opposite and of a time equal to the time of the pulses generated by D10; the monostable trigger circuit D3 is excited by the end line pulses. Also the pulses coming from D3 (FIG. 21) are applied to circuit D7 which transforms them into single detached sinusoidal oscillations, having a phase opposite to that of the single sinusoidal oscillations coming from D10.

FIG. 2*i* represents the pulses having a time one-third of the "unitarian" time coming from circuit D10; FIG. 21, as well, represents those coming from circuit D3. FIG. 2*m* represents the corresponding single detached sinusoidal oscillations, corresponding to the transition and end line pulses.

FIG. 2*g* represents the rectangular pulses, which are sent to the two-speed scanning line axis, to slow their speed.

3. Scanning raster with two-speed scanning line axis.

The constitution of the raster which accomplishes the scanning of the image at two speeds is now explained. In block C and in block B (FIGS. 4 and 5) are contained respectively the scanning line axis and the staircase frame axis.

The two-speed line axis is obtained by charging a condenser with constant current. Thus the high speed time axis is obtained; and such speed must be reduced to a lower value in a prefixed way during the "unitarian" times corresponding to the tonality transition points.

At line end, when the above-mentioned condenser has reached the voltage designed for maximum deflection, a suitable circuit, working at the above-mentioned condenser maximum voltage, operates to create the end line rectangular pulse which discharges the condenser (FIG. 2*h*). The same end line pulses operate to create the staircase frame axis by controlling the advancing charge at constant current, of the condenser relevant to the staircase frame axis.

In opposition to traditional rasters, the scanning line axis, as well as the staircase frame axis have a variable time according to the changing number of the tonality transition points of the image.

Block C containing the elements for the constitution of the two-speed scanning line axis includes: the C2 scanning line generator, the C4 endline pulses generator, the C1 power amplifier for the control of deflection coils, electromagnetic deflection being adopted in this example, and circuit C3 which operates to transfer on a single double-wire line the tonality transition pulses, coming from the two separated double-wire lines, connected with the circuits of blocks D6 and D9. This transfer makes it possible to apply such pulses to the circuit of the scanning line axis, in order to achieve its slowing at low speeds to the time of each one of said pulses.

Block B, containing the elements for the constitution of the staircase frame axis, includes the B2 staircase frame axis, the B3 end frame pulse generator and B1 power amplifier for the control of the frame deflection coils.

In Block A, FIGS. 4 and 5, is contained the protection circuit of the scanning tube which provides also for the blanking of the return times.

4. Switching from phone to video and vice versa at transmission. Block E, FIGS. 4 and 5, contains the circuits necessary to pass by means of a short depression of a push button from telephone communication to video communication and, automatically, from the video at the end of the raster, to the telephone, as in the present example only one frame is supposed to be transmitted.

Block E, FIGS. 4 and 5, includes the electronic circuit E1 for excluding the telephone apparatus during video transmission, and the binary circuit E2, which, by operating a pushbutton, puts the video transmitter into operation, and at the end of the frame provides automatically for the reinsertion of the telephone apparatus and for the stopping of the video transmitter.

5. Switching from phone to video and vice versa at reception.

Figure 6:
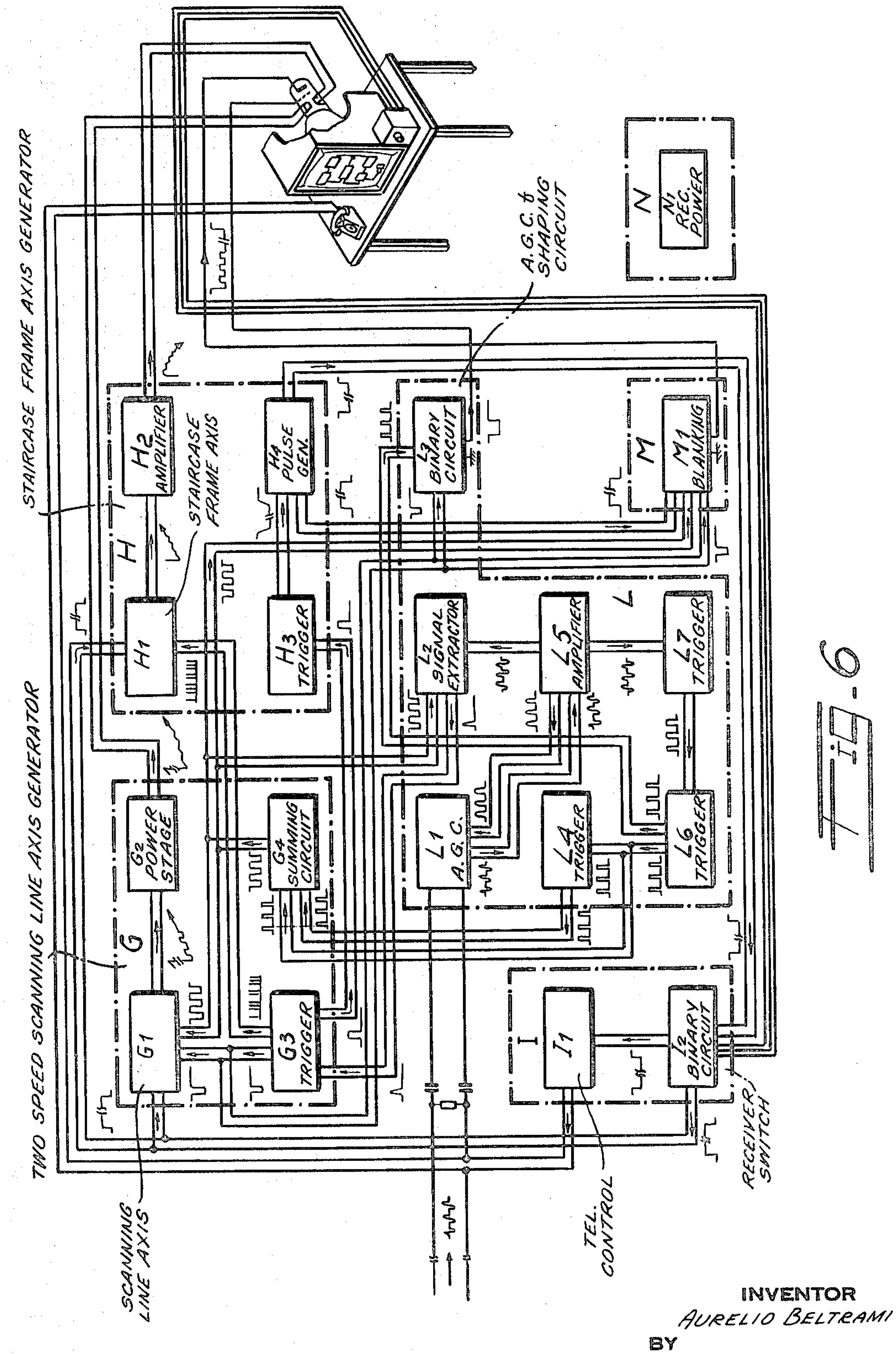

Also at reception (see FIG. 4 and FIG. 6) a block I exists, which includes the control binary $I_2$, that, when the subscriber presses the pushbutton of the phonovideo commutator, excludes the telephone apparatus from the line by means or circuit $I_1$ and puts the video receiver into operating condition, and that, at the end of the video transmission, provides automatically for the reinsertion of the telephone apparatus and for the termination of operation of the video receiver.

As already mentioned the arriving signal consists of single detached sinusoidal oscillations, corresponding to the tonality transition points and to the starting points of end line pulses, the latter ones being of the same intensity and time as the tonality transition ones, but with opposite phase (FIG. 3*a*).

6. Automatic gain control: The arriving signals evidently have different intensities according to the distances over which they travel and an automatic gain control is required. This is provided by circuit $L_1$.

7. Shaping of the arriving detached single sinusoidal waves. Sinusoidal signals coming out of $L_1$ are amplified by circuit L5; and sinusoidal signals coming out from L5 must be shaped again into rectangular ones, having "unitarian" time. Therefore, they are sent to the bistable trigger circuit L7, which transforms them into rectangular signals with variable time (FIG. 3*b*). The time is variable because, though they have started identical, the sinusoidal oscillations, owing to distortions due to line disturbances and their imperfect sinusoidality, at starting, are no longer identical at reception.

Rectangular signals coming out from L7 must be shaped into rectangular signals perfectly identical in intensity and time ("unitarian"). This problem has been solved as follows:

The rise time of the signal coming out from L7 excites a monostable trigger circuit L6, which produces rectangular pulses whose time is equal to about one half of the "unitarian" time (FIG. 3*c*). The decay time of these latter rectangular pulses excites a second monostable trigger circuit L4, which generates further rectangular pulses, whose time must be such that, when added to the time of signals coming out from L6 (FIG. 3*d*) the total sum is the "unitarian" time. The sum of the rectangular pulses coming out from L6 and L4 is produced by circuit G4 (FIG. 3*e*), which constitutes a portion of block G including the elements necessary to the formation at reception of the two-speed line axis. The pulses coming out from L6 are also fed to commute binary circuit L3, which allows the electron beam to pass, by acting on the control grid of the kinescope, and to illuminate the screen till the arrival of the subsequent tonality transition pulse (FIG. 3*h*) or vice versa.

In case a transition pulse fails to arrive, the image would turn from positive into negative. To avoid this, binary circuit L3 is always placed in the same condition by the end line rectangular pulse, coming from circuit G3.

During the time of the transition rectangular pulses, if the screen is illuminated, the slowing of the scanning line would cause an excessive light emission on the screen. This defect is corrected by applying the same tonality transition pulse to circuit $M_1$, which operates to reduce the intensity of the electron beam during the above-mentioned transition times. Circuit $M_1$ also provides for the protection of the receiving tube, in case the line deflection should be missing, as well as for the blanking of the return times.

Sinusoidal signals coming out from L5 are also sent to circuit $L_2$, which provides for the extraction of single detached sinusoidal oscillations relevant to the points corresponding to the starting of the end line pulses, which are then sent to the circuit G3, which is a monostable trigger circuit. It operates to transform them into rectangular pulses with a time equal to that of the end line pulses generated on transmission. (FIG. 3*e*).

8. Receiving raster with two-speed scanning line axis and staircase frame axis. As in transmission, in reception as well as two-speed scanning line axis generator G1 exists, which is followed by the G2 power stage for the control of the line deflection coils. The slowing is obtained here, as on transmission, by varying the charge speed of the condenser, by means of the rectangular pulses coming from G4 (FIG. 3*e*). FIG. 3*g*shows the shape of the two-speed line axis slowed in correspondence to the transition pulses and to the beginning of the line pulse.

The frame axis contained in block H is a staircase axis and is controlled by the end line pulses. At the end of the picture, (only one picture being transmitted) the end line pulses are missing, which create the staircase frame axis, and also keep a bistable trigger circuit H3, in one of the two stable conditions by means of the voltage obtained by the integration of the end line pulses. When the arrival of the end line pulses stops, the H3 circuit changes state and emits the pulse causing the commutation of control binary $I_2$ which also provides for the switching of the line from video to phone and for the return to the quiescent state of the video receiver.

The segments reconstructed in reception according to their width (superior, equal or inferior to the "unitarian" one) are those of FIG. 1, corresponding to FIG. 1*a*′, 1*b*′, 1*c*′, 1*d*′, 1*e*′.

BILATERAL TRANSMISSION

Second Example

Figure 7:
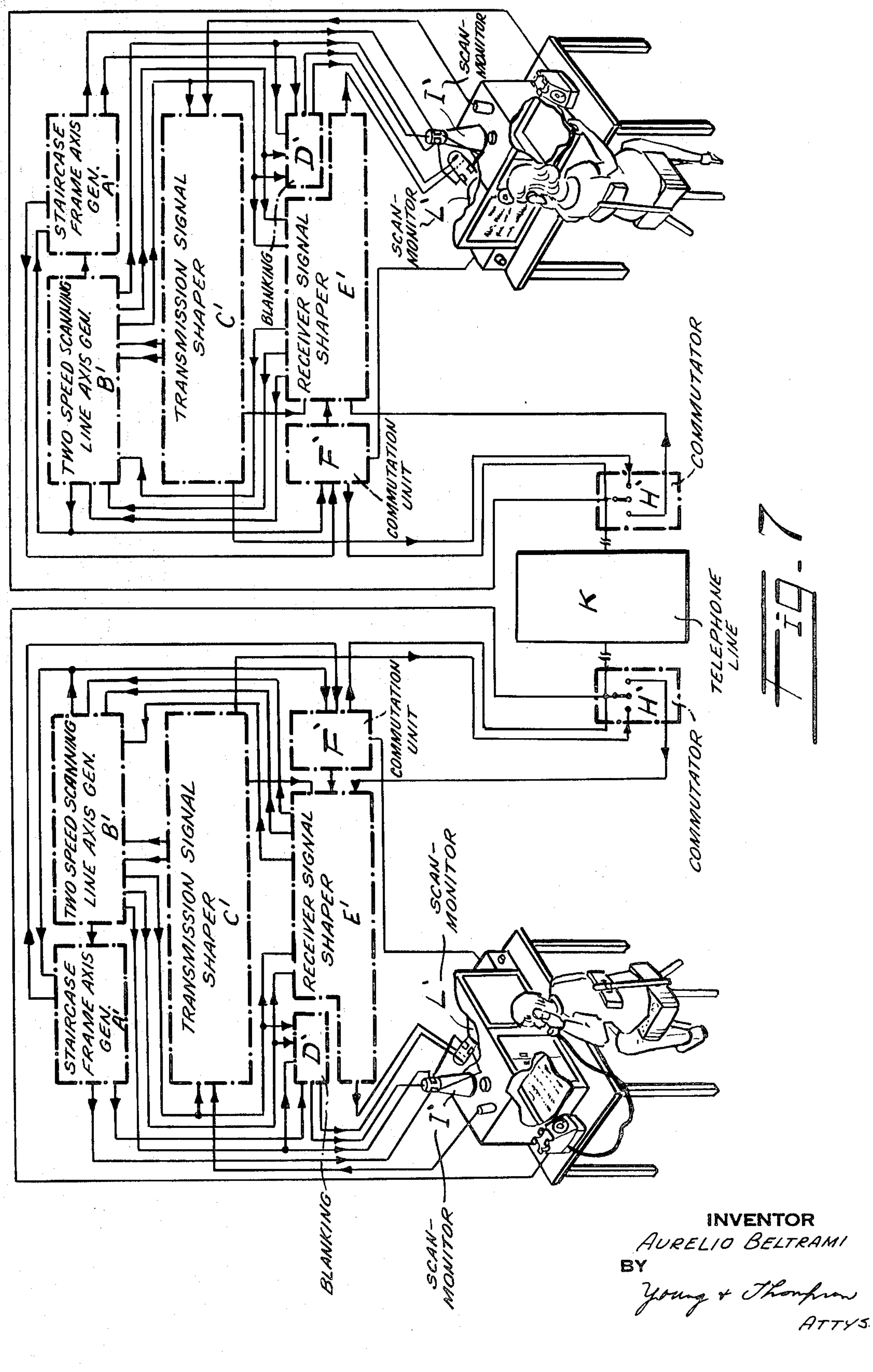

In case of bilateral transmission, each subscriber must have the transmitter portion as well as the receiving one of the video apparatus. Blocks A′, B′, C′, D′, E′, F′, of FIG. 7 contain the elements of the electronic circuit added to the ordinary telephone apparatus of each subscriber.

Obviously, the elements serving in transmission as well as in reception will not be repeated, that is: the two-speed scanning line axis (block B′), the staircase frame axis (block A′), the commutation circuit phonovideo and vice versa and contemporary putting into operation of the video (block F′).

The commutator H′ with three positions (transmission-turned off-reception) operator to connect the above-mentioned circuits and the telephone line with block C′ (shaping of the signal to be transmitted) for transmission and with block E′ (shaping of the received signal) for reception. In transmission I′ is the scanning tube D′ receives line and frame signals from B′ and performs a tube protection and blanking function similar to A in FIG. 4 and the tube L′ can be used as monitor, while in reception the tube L′ is used as receiver.

In case tube I′ should carry out the flying spot scanning, it can be used in reception for the possible instantaneous duplication of the received image.

Figure 8:
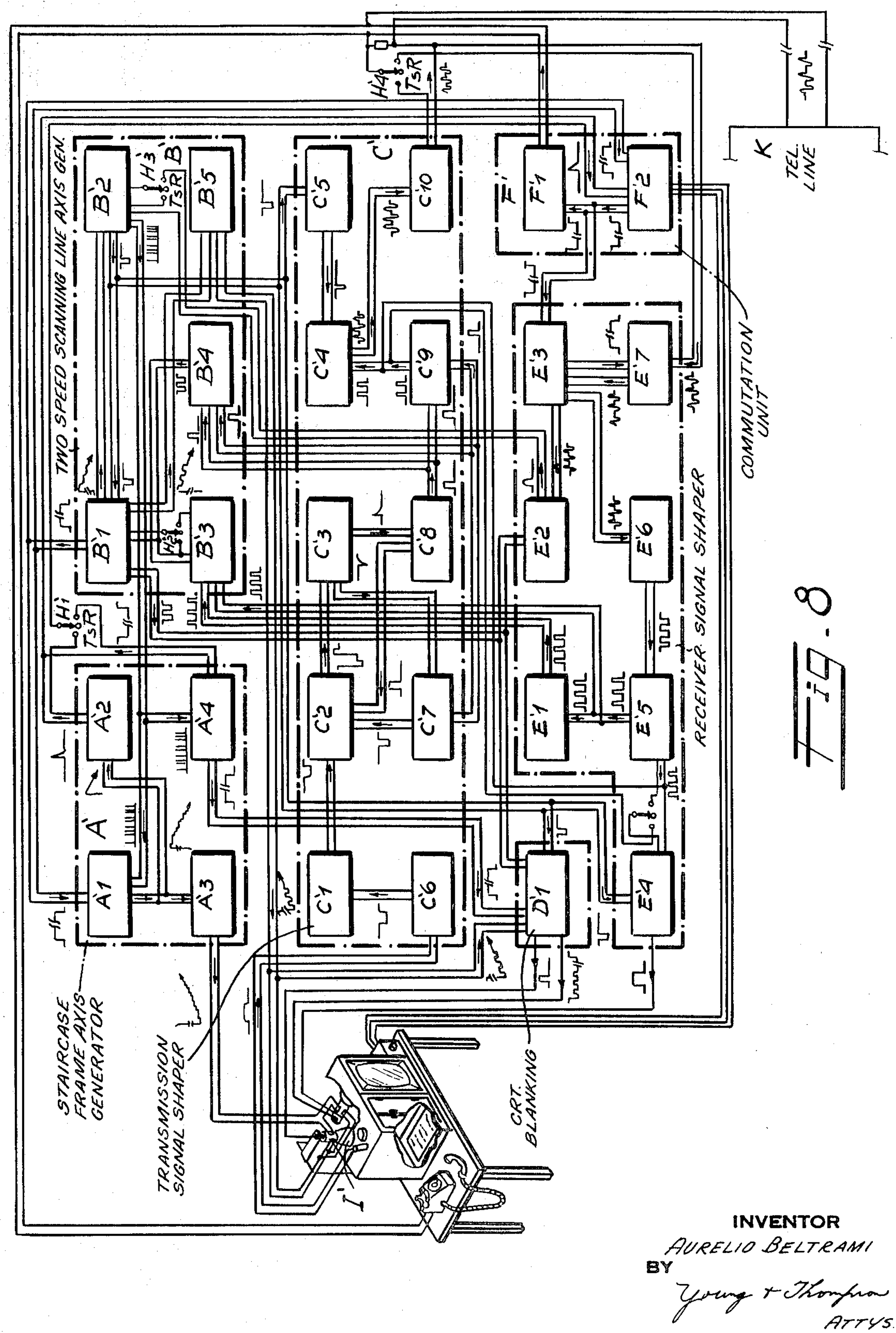

The operation of the apparatus relevant to the video-bilateral transmission, is perfectly analogous to the one described in the first example. The block diagram is represented by FIG. 8, wherein circuits serving for transmission as well as for reception have not been repeated, as it has been already mentioned. On the contrary, commutators have been added to establish transmission or reception or nonworking.

Storage tubes with electrostatic deflection have also been used as kinescopes.

Before describing in detail the apparatus relevant to the third example, the following remarks are mentioned:

In order to see the image in full light and with no flicker without using storage tubes, it is necessary, as it is done in conventional television, to transmit about twenty complete pictures per second. This means that for a video band coinciding with the phonic band, the portion of the image transmissible by adopting the usual video scanning, would be so limited that it could not be used. For instance, if a manuscript or a printing is to be transmitted, such portion would correspond, adopting the usual video scanning, to only one letter or to not more than two letters of one word.

On the contrary, by adopting the fast scanning proceeding, the portion would include, instead of one or two letter, at least twenty of them or even more, corresponding to two or three words.

If the board bearing the document is displaced under the scanning raster, in a continuous uniform motion, corresponding to the reading speed, the subscriber will see running, in front of him, the whole document at the normal reading speed. If, on the contrary, the board bearing the document will be displaced so as to scan a required portion of the image, the subscriber will have the possibility of seeing on the screen of the kinescope the portion of image he is interested in, for the whole period of time desired by him. He may subsequently pass to another portion of the image.

In the two mentioned examples scanning and reception have been realized by means of cathode-ray oscillographs with electromagnetic deflection. A greater transmission rapidity of the image may be obtained by building suitable cathode-ray oscillographs with electrostatic deflection.

Third Example

For the two tonalities images when the video band does not invade the phonic one, the conversation may continue even during video transmission. When, on the contrary, the video is transmitted on the phonic band, the conversation must stop during video transmission. In this case it will be very useful if the video automatically disappears from the line when the phone enters on the same line, and also reappears when the conversation stops. The subscriber who receives the image by subsequent portions can thus ask by telephone the subscriber who transmits the video to stop, for instance, on a signature. Should the subscriber who is receiving the video be interested in a detailed identification of the signature itself, he will have the possibility of asking the subscriber who is transmitting the video to diminish the dimension of the scanning raster to examine the same signature by subsequent continuous portions, remarkably enlarged.

In this case the kinescope is a cathode-ray tube of small dimensions like the scanning one. The screen of the flying-spot scanning tube is of a low persistence; the screen of the kinescope has such a persistence as to reduce flicker to the minimum, with a number of complete pictures ranging from 15 to 20 per second. The displacement of the image may be either automatic or manual. In the latter case, it has been convenient to put the document on a board displaceable in two orthogonal directions, by means of two knobs, each one controlling a gear wheel with rack. The displacement of the board on which is put the document to be video transmitted may be manual or automatic; this is particularly useful for documents having a great number of words. If the subscriber receiving the image is provided with a board having an automatic displacement, synchronized with the board of the subscriber who is transmitting the video, (synchronized, for instance by means of the transmission of pulses at the end of each line of the document), automatic transmission of the document will be possible in this case. Besides, if the board of the subscriber receiving the image is connected with a duplicator, the whole transmission of the document may, once it has been started, continue even without the presence of the subscribers who must, at the end of the transmission, the former take out the document transmitted, the latter its duplicate and both hang up the microtelephones. This hanging up will interrupt the phone operation and the video one, as well as the movement of the boards having automatic displacement.

The increase of the detail corresponds to the reduction of the scanned portions and may be obtained by optical or electronic means.

In the present example the scanning area is fixed, while the board bearing the image is movable. The number of complete pictures per second and the persistence of the screen of the small kinescope must be rated in such a way that the reading, for instance, of a word is not disturbed on the screen by the residue of the preceding word and that, in the same time, flicker is avoided.

In the present example it has been stated that the frequency of the single detached sinusoidal oscillations corresponding to the tonality transition points, as well as to the end line points and end frame points, should be between 1,500 and 2,000 Hz., it being understood that, for a private exchange, such frequency can be remarkably increased, till it becomes inaudible, with the subsequent improvement of the detail, as the increase of the reading speed, beyond the usual one, could not be profitable. The inaudible carrier frequency, (as already mentioned), makes possible the video-phone simultaneous transmission, that is the reader, while speaking, can also read the document. For inaudible carrier frequencies it will be possible to obtain simultaneous bilaterality even for the video. For long distance communications, including the intercontinental ones, the frequency of the above-mentioned sinusoidal oscillations will be of about 1,500 Hz.

Figure 9:
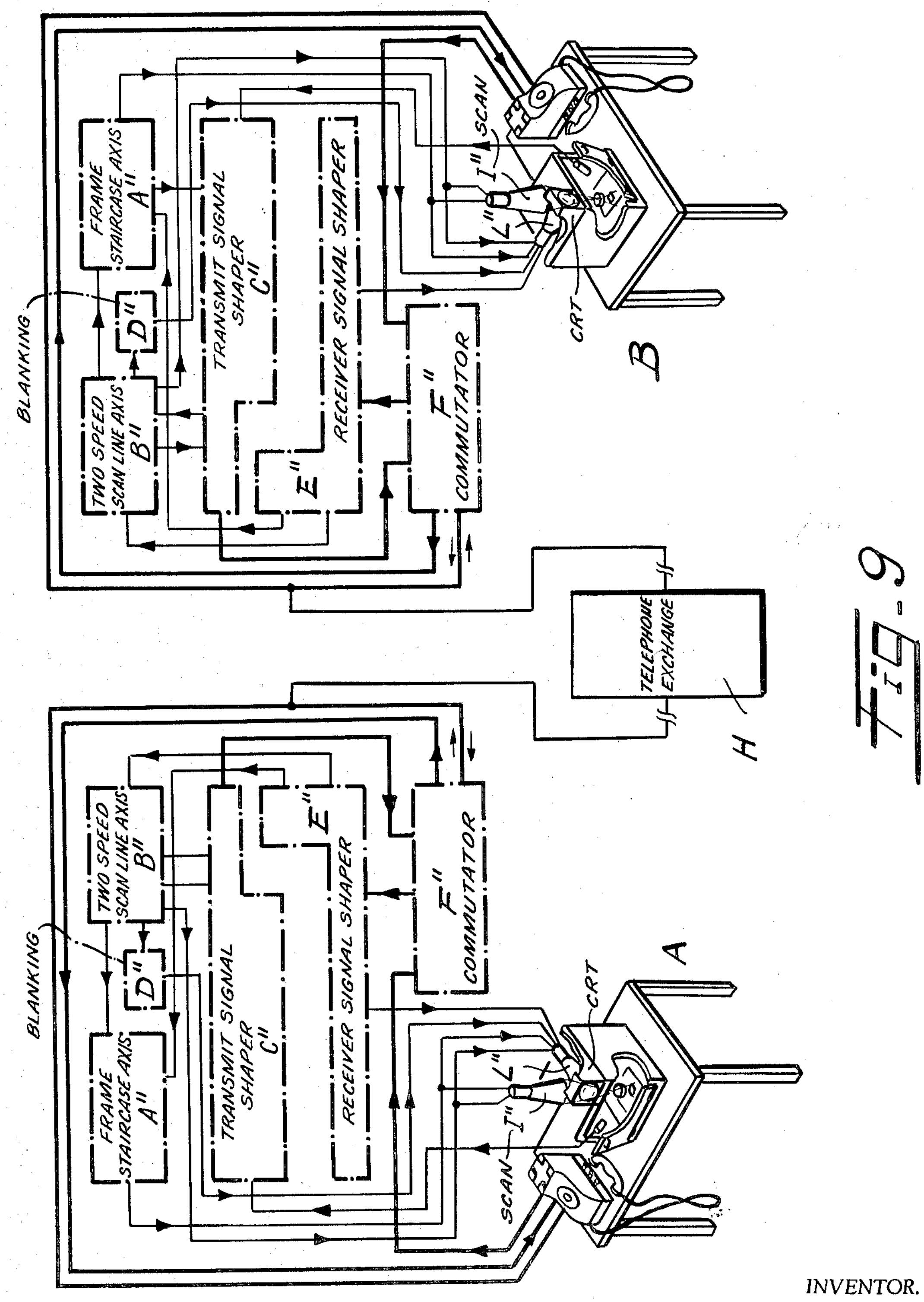
FIGS. 9 and 10 are relevant to the third example.
Figure 10:
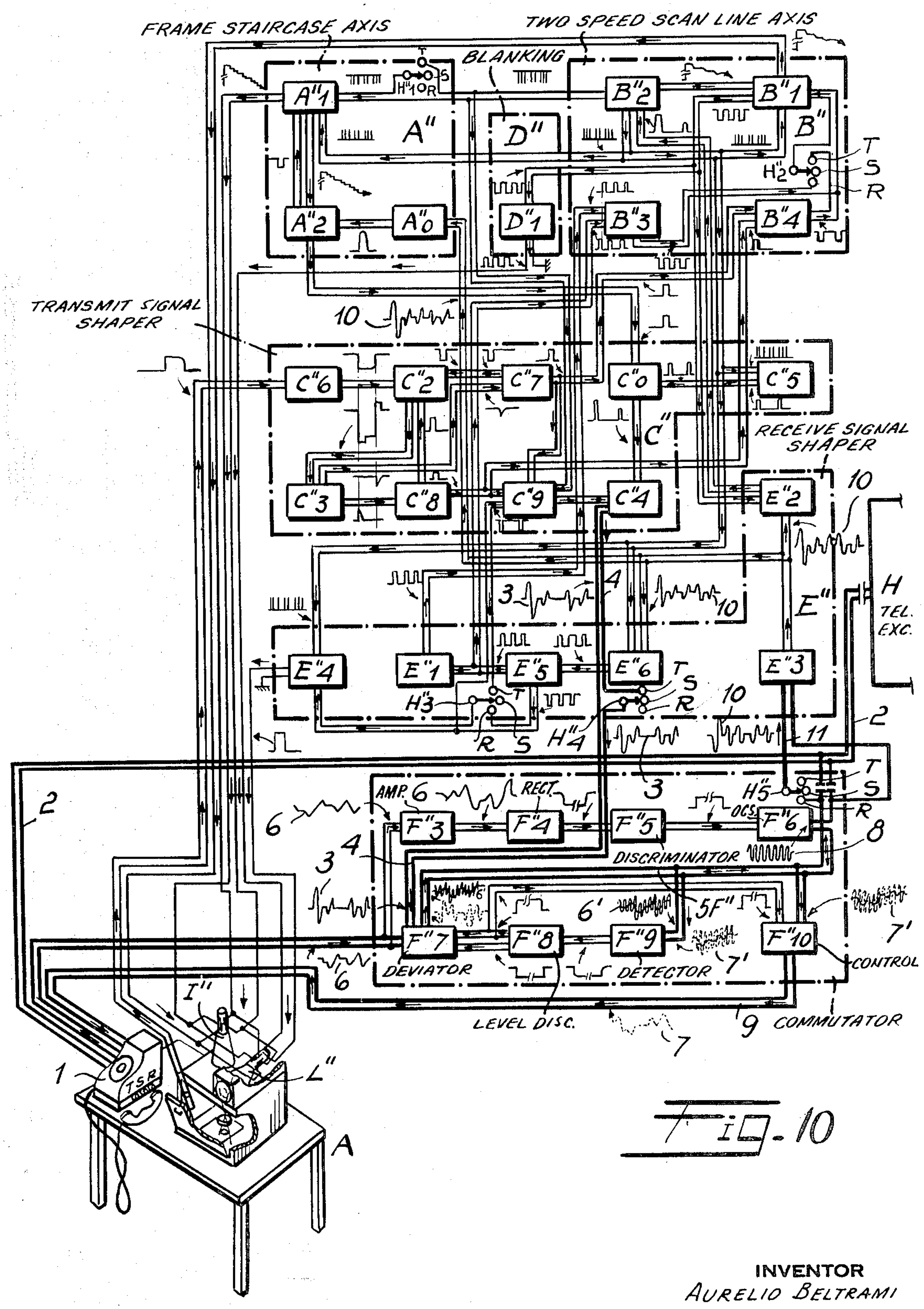

In the present example, when the phone appears, the video automatically disappears and automatically reappears only at cessation of conversation. It is established, in this example, that reappearance takes place after a predetermined time, superior to the normal pauses of conversation. FIG. 9 represents in a schematic way the two video transmitting-receiving apparatus added to the ordinary telephone apparatus of each one of the subscribers communicating with each other. Said video transmitting-receiving apparatus are equipped with an electronic automatic commutator for video-phone commutation and vice versa. FIG. 10 shows the block diagram of the video-transmitting device, added to the telephone apparatus (including the phone-video commutator) of one of the two subscribers.

In FIG. 9 blocks A'', B'', C'', D'', E'' are the elements of the video transmitting-receiving device for fast transmission of two tonalities images, similar to those described in the first and second examples. Block F'' is the electronic phone-video commutator and vice versa. Blocks I'' and L'' are respectively the scanning cathode-ray tube and the kinescope. Circuit A'' represents the frame staircase axis, circuit B'' the two-speed scanning line axis, circuit C'' is used for the shaping of the video signals, in order to make it suitable to be transmitted according to the present system. Circuit E'' is used for the shaping of the arriving video signal, in order to make it suitable for the reconstitution, at reception, of the image.

As the above-mentioned circuits are analogous to those of the previous examples, only commutator F'' is described. It includes, as in FIG. 10, circuits $F_3$'', $F_4$'', $F_5$'', $F_6$'', $F_7$'', $F_8$'', $F_9$'', and $F_{10}$''. The operation of the automatic commutator is the following: The phonic signal coming from the microphone of the subscriber who is speaking (or from the microphone of the two subscribers if they are both speaking) is amplified by the relevant circuits $F_3$'' and subsequently rectified and leveled by circuits $F_4$''; the output of circuits $F_4$'' is applied to the level discriminators $F_5$'', which control circuits $F_6$'', which correspond to sinusoidal oscillators, whose frequency, in the present example, is 3.2 kHz., so that voltage at 3.2 kHz. so that voltage at 3.2 kHz. is always on the line when at least one of the two subscriber is speaking. The signal at 3.2 kHz. serves the video-phone commutation, which takes place as follows:

The video is on the line: if at least one of the two subscribers is speaking, for a short time the video is present on the line, as well as the signal at 3.2 kHz. which, separated and detected by means of circuit $F_9$'' puts the level discriminator $F_8$'' into operation, which, in its turn, controls the electronic deviator $F_7$''. Such deviator operates the commutation; that is it blocks the video of the subscriber who is transmitting it and sends the phonic signal on the line. The same level discriminator $F_8$'' controls circuit $F_{10}$'' of the subscriber. This circuit allows the arrival of the phone signal, separated from the signal at 3.2 kHz., to the telephone receiver, only in the time during which the phone signal is transmitted, and prevents the arrival of the phonic signal at audible frequency, generated by the video, during the transmission time of the video itself.

In FIG. 10 are shown the paths and the shapes of the various signals, relevant both to the video and to the phone, before being transmitted on the connection line between the subscribers A and B, through the telephone exchange, or after being received from the same line. A and B are the two subscribers who want to realize televideophonic communication. The telephone apparatus 1 of subscriber A is connected to telephone exchange H, through line 2. The telephone apparatus 1 bears a commutator at three positions; the first one (position S) for the usual telephone transmission; the second one (position T) for video transmission; the third one (position R) for video reception.

Subscriber A, after establishing, through his dial, the connection with subscriber B, wants to transmit the video. He closes the above-mentioned commutator on T; the video signal 3, in the form of detached sinusoidal oscillations comes, through connection 4 to the electronic commutator $F_7''$ which, through connection 5, transmits it on line 2, connected through the telephone exchange, to subscriber B. Should subscriber A intend to speak to subscriber B, during video transmission, the telephone signal 6 of subscriber A comes both to circuit $F_7''$ and circuit $F_3''$.

As already seen, commutator $F_7''$ blocks the passage of video 3 to connection 5, while allowing the passage of phone 6, which adds itself to the auxiliary sinusoidal signal, already mentioned, of 3.2 kHz. and indicated by 8; the sum signal is indicated by 6'. The telephone signal 7', arriving from subscriber B, after being separated in $F_{10}''$ from the auxiliary signal at 3.2 kHz., arrives to the phone receiver of subscriber A through connection 9. The phone signal, separated from the signal at 3.2 kHz. is indicated by 7. When the conversation stops, more precisely after a period not less than that of the normal pauses of conversation, video 3, through connection 5, again reaches again line 2.

If subscriber A wants to receive the video from subscriber B, he closes the video commutator on R, while subscriber B closes it on T and the video signal 10, transmitted by subscriber B, passes directly from line 2, through connection 11, to the set of circuits which transforms the detached sinusoidal oscillations, corresponding to the tonality transition points and to the starting of line end and frame end pulses, into voltage variations to be applied to the grid of the kinescope L'' and to the axes generating the reception raster, as it has been described in full detail in the first two examples.

I claim:

1. An electronic system for providing the high speed transmission of two level fixed pictures over existing telephone networks, automatically giving rise to transmission times proportional to the information content of the picture to be transmitted comprising picture transmission means and picture reception means connected at spaced points to said telephone network, said picture transmission means including cathode-ray tube circuit means adapted to scan said picture to be transmitted by means of a raster with a two-speed scanning line time base and a frame staircase-shaped time base to provide output pulses indicative of the tone transition points of said scanned picture and end line pulses, said cathode-ray tube scanning means operating to scan each tone transition with a lower speed scan for a time interval sufficient for the transmission of a sine-shaped pulse over the telephone network and to scan the picture areas containing no tone transitions with a high speed scan, means connected to receive said end line pulses and operative to differentiate said end line pulses in form from said tone transition pulses, and shaping means connected to receive said tone transition pulses and said differentiated end line pulses, said shaping means operating to transform said tone transition and end line pulses into single, detached sinusoidal signals for transmission by said picture transmitting means.

2 The electronic system of claim 1 wherein said cathode ray tube circuit means includes deflection control means connected to receive said tone transition pulses and to control said scanning line time base, said deflection control means operating to normally provide a high speed scan at the scan rate for said picture areas containing no tone transitions, but upon reception of a tone transition pulse, to slow said scan for the duration of said transition pulse.

3. The electronic system of claim 2 wherein said deflection control means operates to provide said end line pulses at the end of each line scan, said deflection control means operating to produce said frame staircase-shaped time base by integration of said end line pulses, whereby the scanning line time base and frame staircase time base vary in time according to the number of tone transition points in a scanned picture.

4. The electronic system of claim 3 wherein said reception means is connected to receive said single detached sinusoidal signals from said telephone network, said reception means including receiving cathode-ray tube display means having a control grid to control the intensity thereof, receiver deflection means to control the scan line time base for said receiving cathode-ray tube, line flyback generator means to control the scan line length for said receiving cathode-ray tube, and means to separate said tone transition pulses from said end line pulses in said received sinusoidal signal, said means providing said tone transition pulses to said receiver deflection means to control the speed of the scan line time base and to said control grid and said end line pulses to control said line flyback generator means.

5. The electronic system of claim 4 wherein the frequency of said single detached sinusoidal signals transmitted over said telephone network is above audio frequency to permit simultaneous audio transmission with video transmission on said network.